United States Patent
Knepler

(10) Patent No.: US 6,238,721 B1
(45) Date of Patent: May 29, 2001

(54) WIRELESS GRINDER-BREWER INTERFACE AND METHOD OF USE

(75) Inventor: John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 09/337,102

(22) Filed: Jun. 21, 1999

(51) Int. Cl.⁷ .............................. A23L 2/00; G01N 33/02
(52) U.S. Cl. ........................ 426/590; 426/231; 426/433; 99/250; 99/289 R; 99/323; 141/192; 141/DIG. 1
(58) Field of Search .................... 426/433, 435, 426/231, 290; 99/289 R, 285, 323, 280, 283, 282; 141/94, 95, 192, 198, DIG. 1

(56) References Cited

U.S. PATENT DOCUMENTS

| | | | |
|---|---|---|---|
| 3,423,209 | * | 1/1969 | Weber ................................. 426/433 |
| 4,468,406 | * | 8/1984 | D'Alayer De Costemore D'Arc ................................................................. 426/231 |
| 5,072,660 | * | 12/1991 | Helbling .................................. 99/280 |
| 5,094,153 | * | 3/1992 | Helbling .................................. 99/280 |
| 5,158,793 | | 10/1992 | Helbling ................................ 426/231 |
| 5,186,399 | | 2/1993 | Knepler et al. ........................... 241/34 |
| 5,375,508 | | 12/1994 | Knepler et al. .......................... 99/280 |
| 5,417,145 | * | 5/1995 | Joseph, Jr. et al. ...................... 99/280 |
| 5,511,465 | * | 4/1996 | Friedrich et al. ....................... 99/286 |
| 5,542,342 | * | 8/1996 | McNeill et al. ......................... 99/280 |
| 5,568,763 | * | 10/1996 | Kunzler .................................. 99/280 |
| 5,724,882 | * | 3/1998 | Gallas et al. ........................... 99/285 |

OTHER PUBLICATIONS

Optek Technology, Inc, Product Bulletin OHN3506/3507, Ratiometric Linear Hall Effect Sensor, Aug. 1996.

* cited by examiner

Primary Examiner—Gabrielle Brouillette
Assistant Examiner—Sherry A. Dauerman
(74) Attorney, Agent, or Firm—Barnes & Thornburg

(57) ABSTRACT

A brew funnel has a selector thereon which can be set to indicate a desired batch size and type of coffee. Sensors on an associated coffee grinder and on an associated coffee brewer are capable of sensing the structure to grind an appropriate amount of coffee and to brew an appropriate amount of coffee, respectively, when the brew funnel is mounted thereon.

11 Claims, 2 Drawing Sheets

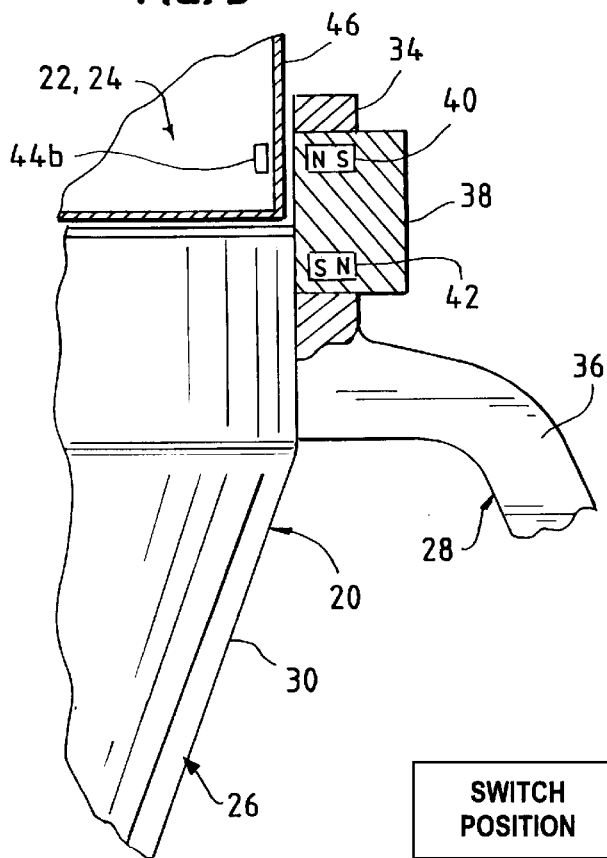
FIG. 3
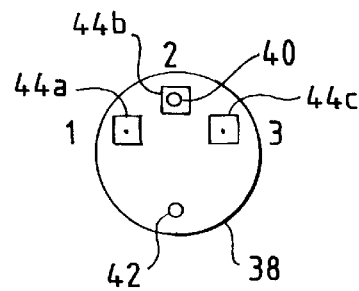
FIG. 4
FIG. 5
| SWITCH POSITION | | SENSOR | | |
|---|---|---|---|---|
| | | 1 | 2 | 3 |
| REG. | SMALL | + | 0 | 0 |
| | MED. | 0 | + | 0 |
| | LARGE | 0 | 0 | + |
| DECAF. | S | − | 0 | 0 |
| | M | 0 | − | 0 |
| | L | 0 | 0 | − |
OUTPUT CHART
0 VOLTAGE WITH NO MAGNET
− NEGATIVE GOING
+ POSITIVE GOING
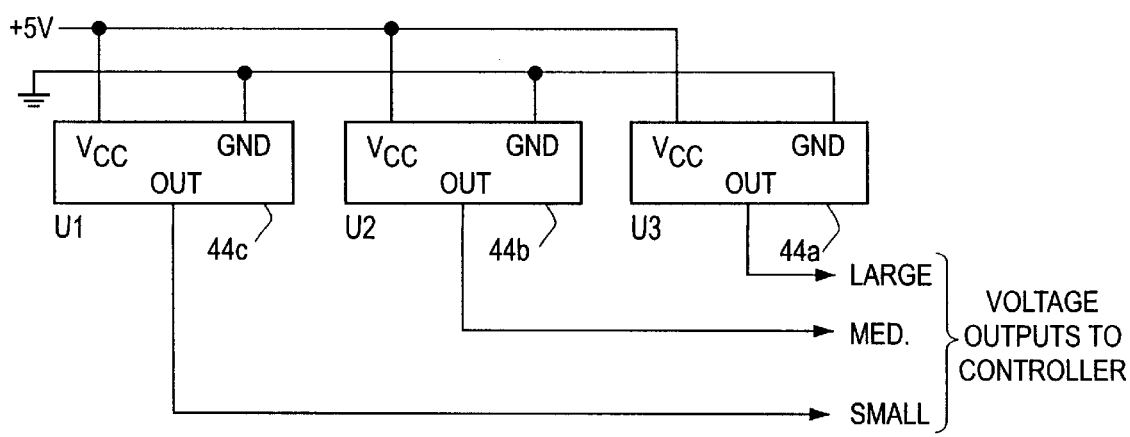
FIG. 6
U1, U2, U3 ARE OPTEK TYPE OHN 3150U

WIRELESS GRINDER-BREWER INTERFACE AND METHOD OF USE

BACKGROUND OF THE INVENTION

This invention is generally directed to a novel wireless coffee grinder and coffee brewer interface and its method of use. More particularly, the invention contemplates a novel wireless coffee grinder and coffee brewer interface which utilizes a brew funnel which can be mounted on either the coffee grinder or the coffee brewer to communicate information regarding batch size and type to the coffee grinder and to the coffee brewer.

U.S. Pat. No. 5,186,399, which identifies the same assignee as the present application, describes a system of connecting a multiple batch size brewer and a dual hopper grinder in order to coordinate the amount of ground coffee with the selected brewing volume. This system could possibly result in some users being confused about setting the switches on the coffee grinder and on the coffee brewer to achieve the desired results. This problem is compounded when a dual head coffee brewer is used with a dual hopper coffee grinder, then complicated further when a single coffee grinder services more than one coffee brewer. In addition, the grinding operation is generally much faster than a brewing cycle (seconds versus minutes). Consequently, it is feasible for one coffee grinder to service several coffee brewers. Due to the complexity and expense of the switching and interconnect cables, however, a maximum of two coffee brewers are used with the system disclosed in the '399 patent.

The present invention provides a novel structure and method which overcomes the problems found in the system disclosed in the '399 patent. Other features and advantages will become apparent upon a reading of the attached specification, in combination with a study of the drawings.

OBJECTS AND SUMMARY OF THE INVENTION

A general object of the present invention is to provide a novel wireless coffee grinder and coffee brewer interface and its method of use.

An object of the present invention is to provide a novel wireless coffee grinder and coffee brewer interface which utilizes a brew funnel which can be mounted on either the coffee grinder or the coffee brewer to communicate information regarding batch size and type to the coffee grinder and to the coffee brewer.

Briefly, and in accordance with the foregoing, the present invention discloses a brew funnel having a selector thereon which can be set by a user to indicate a desired batch size and type of coffee. Sensors on an associated coffee grinder and on an associated coffee brewer are capable of sensing the structure to grind an appropriate amount of coffee and to brew an appropriate amount of coffee, respectively, when the brew funnel is mounted thereon.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 3 is a partial fragmentary side elevational view of the brew funnel, with a fragmentary portion of the brew funnel being shown in cross-section, and a cross-sectional view of a portion of a machine, such as a coffee brewer or coffee grinder, to which the brew funnel is attached;

FIG. 4 is a schematic view of the selector on the brew funnel and sensors in the associated machine;

FIG. 5 is an output chart showing voltages generated under various settings; and FIG. 6 is schematic diagram of the Hall effect sensor circuitry.

DETAILED DESCRIPTION OF THE ILLUSTRATED EMBODIMENT

Figure 1:
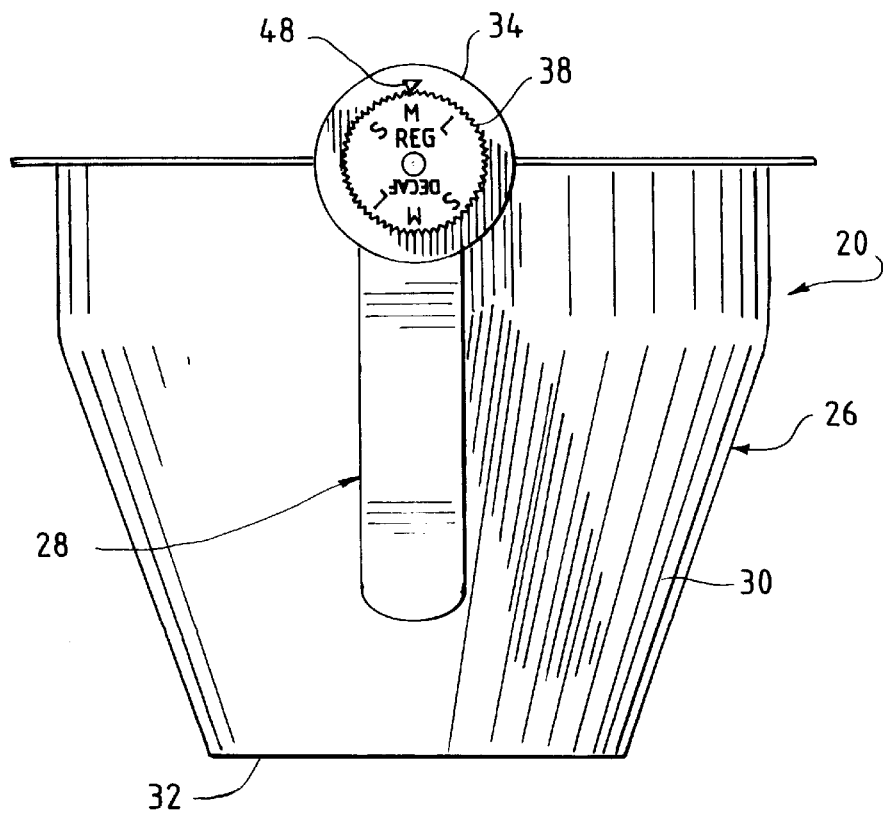
FIG. 1 is a side elevational view of a brew funnel which incorporates the features of the invention.
Figure 2:
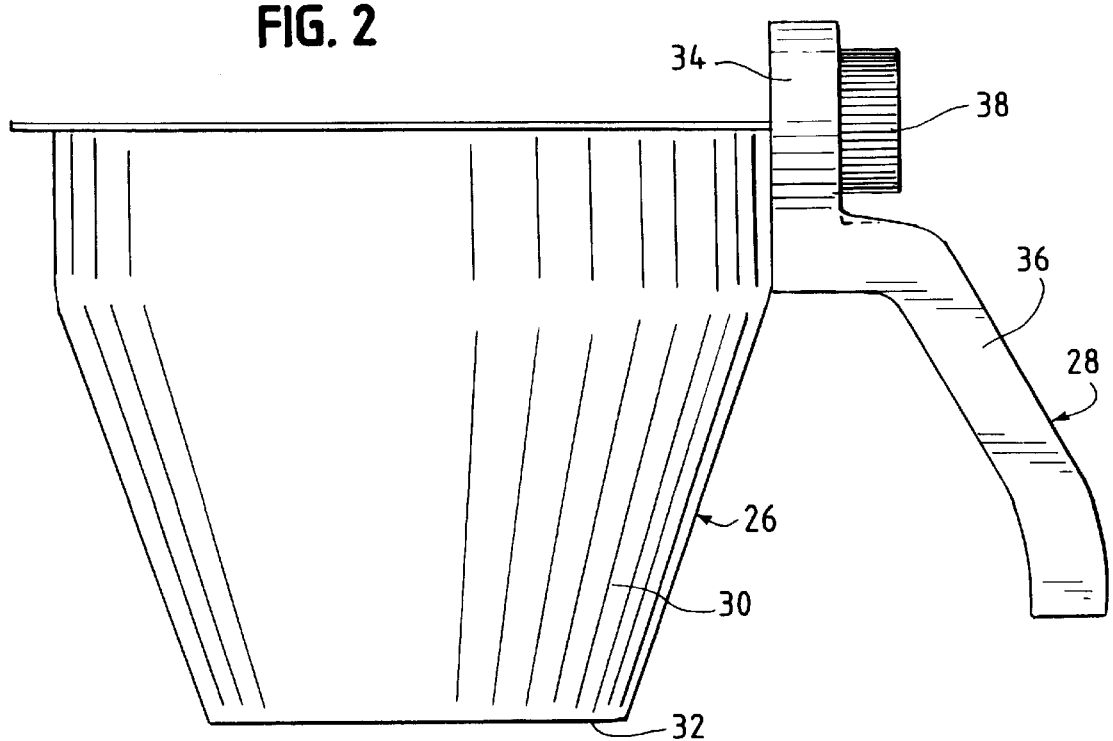
FIG. 2 is a left side elevational view of the brew funnel shown in FIG. 1.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel wireless grinder-brewer interface and its method of use. The interface is provided by a brew funnel 20 which can be mounted on a coffee grinder 22 or a coffee brewer 24.

The brew funnel 20 includes a body 26 having a handle 28 mounted thereon. The handle 28 is mounted on the body 26 by conventional means. The body 26 has a side wall 30 which is generally conical and a bottom wall 32 which is generally flat and has an discharge aperture (not shown) therethrough. The upper end of the body 26 is open.

The handle 28 has an upper portion 34 which is aligned with the side wall 30 and a gripping portion 36 which protrudes outwardly from the side wall 30 of the body 26 so that a user can grip the handle 28 and carry the brew funnel 20. A portion of the upper portion 34 of the handle 28 extends upwardly from the uppermost end of the body 26.

As best shown in FIG. 3, the brew funnel 20 has a selector 38 thereon which allows a user to select a desired batch size and type of coffee. As shown in the drawings, the selector 38 takes the form of a knob 38 having a pair of magnets 40, 42 imbedded therewithin. The knob 38 is rotatably mounted on the handle 28 by conventional means. The knob 28 has an upper portion which extends upwardly from the uppermost end of the body 26 and a lower portion which overlaps the upper end of the body 26. The pair of magnets 40, 42 are imbedded within the knob 38 proximate to the side wall 30 of the body 26 and are diametrically opposed to each other on the knob 38. Magnet 40 is mounted such that its north pole (N) is proximate to the side wall 30 of the body 26 and the south pole (S) is positioned away from the side wall 30 of the body 26. Magnet 42 is oppositely mounted such that its south pole (S) is proximate to the side wall 30 of the body 26 and the north pole (N) is positioned away from the side wall 30 of the body 26.

The exterior surface of the knob 38 has a plurality of indicia thereon, see FIG. 1. One half of the knob 38 has indicia thereon which designates regular coffee (REG) and specifies a batch size of small (S), medium (M) or large (L). The other half of the knob 38 has indicia thereon which designates decaffeinated coffee (DECAF) and specifies a batch size of small (S), medium (M) or large (L). As shown in the drawings, magnet 40 is mounted behind the medium (M) indicia of regular coffee, and magnet 42 is mounted behind the medium (M) indicia of decaffeinated coffee.

Sensors 44a, 44b, 44c are carried on the coffee grinder 22 or on the coffee brewer 24 for sensing the setting selected by the user on the brew funnel 20 when the brew funnel 20 is mounted on apparatus such as the coffee grinder 22 or on the coffee brewer 24. As shown in the drawings, these sensors 44a, 44b, 44c take the form of three (3) Hall effect sensors 44a, 44b, 44c imbedded in a front wall 46 at predetermined positions of the coffee grinder 22 or the coffee brewer 24. The setting on the knob 38 is then wirelessly communicated to the controller of the coffee grinder 22 or to the coffee brewer 24, depending on which apparatus the brew funnel 20 is mounted, to determine a preprogrammed dispensing time, volume or weight. These sensors 44a, 44b, 44c are coupled to a respective controller which controls the operation of the respective apparatus 22 or 24.

When the brew funnel 20 is mounted on the coffee grinder 22 or the coffee brewer 24, the upper portion 34 of the handle 28 which extends upwardly from the uppermost edge of the body 26 and the portion of the rotatable knob 38 thereon align with the front wall 46 of the coffee grinder 22 or the coffee brewer 24 and the magnet, for example and as shown in the drawings magnet 40, aligns with one of the Hall effect sensors, for example and as shown in the drawings Hall effect sensor 44b. The Hall effect sensor 44b senses the presence of the magnet 40 and an appropriate voltage is sent to the controller of the coffee grinder 22 which instructs the coffee grinder 22 to grind an appropriate amount of coffee of a particular coffee type or to the control circuity of the coffee brewer 24 to brew an appropriate amount of coffee, depending on which component the brew funnel 20 is mounted.

The coffee grinder 22 used in the present invention is preferably a dual hopper system, which is known in the art, which has regular coffee beans in a first hopper and decaffeinated coffee beans in a second hopper. Depending on which coffee type is selected and the desired batch size, the appropriate hopper is accessed by opening a respective gate provided at the bottom of the hopper to release the appropriate beans and the appropriate amount of beans to a common grinding unit. While a dual hopper coffee grinder 22 is preferably used in the present invention, it is understood that a single hopper coffee grinder could be used. In this case, a user would simply select a batch size as only one type of coffee would be available.

FIG. 5 shows a chart which illustrates the voltages which would be sent to the controller depending on which setting is selected by the user. The user simply selects a setting by rotating the knob 38 until the desired batch size aligns with the arrow indicia 48 provided on the upper portion 34 of the handle 28, see FIG. 1. Detection of the magnet 40 or 42 by Hall effect sensor 44a indicates a large (L) batch of coffee has been selected; detection of the magnet 40 or 42 by Hall effect sensor 44b indicates a medium (M) batch of coffee has been selected; and detection of the magnet 40 or 42 by Hall effect sensor 44c indicates a small (S) batch of coffee has been selected. Detection of the north polarity of magnet 40 by one of Hall effect sensors 44a, 44b or 44c sends a positive going output voltage to the coffee grinder 22 controller or to the coffee brewer 24 controller, depending on which component the brew funnel 20 is mounted, to indicate that regular coffee has been selected; and detection of the south polarity of magnet 42 by one of Hall effect sensors 44a, 44b or 44c sends a negative going output voltage to the coffee grinder 22 controller or to the coffee brewer 24 controller, depending on which component the brew funnel is mounted, to indicate that decaffeinated coffee has been selected. FIG. 6 illustrates a typical schematic diagram of the Hall effect sensor 44a, 44b, 44c circuitry using commonly available components. As shown in the drawings, the controller would be instructed to process a medium batch of regular coffee. The Hall effect sensor 44b, which senses a medium (M) batch size, would sense the north polarity of magnet 40, thereby indicating a regular coffee selection, and accordingly instruct the controller. If, for example, the knob 38 were set to decaffeinated coffee with a large (L) batch size, Hall effect sensor 44a, which senses a large (L) batch size, would sense the south polarity of magnet 42, thereby indicating a decaffeinated coffee selection, and accordingly instruct the controller.

In use, the user selects the batch size and coffee type by rotating the knob 38 until the associated indicia aligns with the arrow indicia 48. The brew funnel 20 is first mounted on the coffee grinder 22 for the appropriate grinding, and then is physically transported to the coffee brewer 24 for brewing. Therefore, information on batch size and the type of coffee is stored in the brew funnel 20 and is communicated to the coffee grinder 22 and the coffee brewer 24 when the brew funnel 20 is mounted on each. Because the information is carried with the brew funnel 20, there is no need for an interconnecting cable and therefore, the present system is wireless. The elimination of the cable permits the coffee grinder 22 to serve any number of coffee brewers 24. The operation is greatly simplified because only the setting on the knob 38 on the brew funnel 20 is set; there are no switch settings required on the coffee grinder 22 and no switch settings required on the coffee brewer 24.

While the brew funnel 20 is described as having and is shown in FIG. 1 as a six position rotary knob 38, it is to be understood that the number of positions and the switching mechanism can be varied depending on the application, styling requirements, and the like. For example, a linear motion slide switch or push button arrangement could be used.

The sensors provided in the coffee grinder 22 and the coffee brewer 24 can take a variety of forms. The sensors can be effected by any of several different well-known methods of proximity detection, including magnetic, eddy current, capacitance, conductance, photoelectric, inductive, electromagnetic and infrared. In addition, the means on the brew funnel 20 used to convey the information to the coffee grinder 22 and the coffee brewer 24, which is shown in the drawings and is described herein as magnets 40, 42, can take a variety of forms.

Also, while a separate coffee grinder 22 and a separate coffee brewer 24 are preferably used in the present invention, a combined coffee grinder and coffee brewer unit can be used with the present invention. In this situation, the brew funnel 20 is mounted to the combined unit and is not removed therefrom until after the complete grinding and brewing cycle is completed. The coffee grinder can include a dual hopper or single hopper.

While a preferred embodiment of the present invention is shown and described, it is envisioned that those skilled in the art may devise various modifications of the present invention without departing from the spirit and scope of the appended claims.

What is claimed is:

1. A method comprising the steps of:
  providing a funnel having a selector actuable by a user for setting an indication of batch size thereon;
  providing a dispenser having at least one dispenser sensor therein for sensing said selector, said selector and said at least one dispenser sensor being in wireless communication with each other when said funnel is mounted on said dispenser;

said user setting said selector to a predetermined batch size thereon;

mounting said funnel on said dispenser;

said at least one dispenser sensor sensing said setting;

dispensing a substance into said funnel;

removing said funnel from said dispenser;

providing a beverage maker having at least one beverage maker sensor for sensing said selector, said selector and said at least one beverage maker sensor being in wireless communication with each other when said funnel is mounted on said beverage maker;

mounting said funnel on said beverage maker;

said at least one beverage maker sensor sensing said setting; and producing a beverage.

2. A method as defined in claim 1, wherein said selector is a rotatable knob having at least two settings thereon, and wherein during said step of the user setting said selector, said knob is rotated to one of said settings.

3. A method as defined in claim 1, wherein said selector is actuable by a user for setting an indication of a type of beverage thereon, and the user sets said selector to a predetermined type of beverage.

4. A method as defined in claim 3, wherein said selector is a rotatable knob having at least two settings thereon, and wherein during said step of the user setting said selector, said knob is rotated to one of said settings.

5. A dispenser, beverage maker and funnel combination comprising:

said dispenser comprising a dispenser housing and at least one dispenser sensor mounted on said dispenser housing;

said beverage maker comprising a beverage maker housing and at least one beverage maker sensor mounted on said beverage maker housing;

said funnel comprising a body and selector actuable by a user for setting an indication of batch size thereon, said at least one dispenser sensor and said selector being in wireless communication with each other when said funnel is mounted on said dispenser, and said at least one beverage maker sensor and said selector being in wireless communication with each other when said funnel is mounted on said beverage maker.

6. The combination as defined in claim 5, wherein said at least one dispenser sensor is a Hall effect sensor, said at least one beverage maker sensor is a Hall effect sensor, and said selector comprises at least one magnet.

7. The combination as defined in claim 5, wherein said selector comprises a rotatable knob which has at least two settings thereon.

8. The combination as defined in claim 7, wherein said at least one dispenser sensor is a Hall effect sensor, said at least one beverage maker sensor is a Hall effect sensor, and said selector further comprises a magnet which is associated with a respective setting on said rotatable knob.

9. The combination as defined in claim 5, wherein said selector is actuable by a user for setting an indication of a type of beverage thereon.

10. The combination as defined in claim 9, wherein said selector is a rotatable knob having at least two settings thereon.

11. The combination as defined in claim 5, wherein said funnel further includes a handle attached to said body and said selector is provided on said handle.

* * * * *